United States Patent [19]

Rodrigo et al.

[11] 4,258,935
[45] Mar. 31, 1981

[54] BELL END OF A BELL AND SPIGOT JOINT

[75] Inventors: Peter Rodrigo; Kemener J. Whalen; David W. French, all of Littleton, Colo.

[73] Assignee: Johns-Manville Corporation, New York, N.Y.

[21] Appl. No.: 931,342

[22] Filed: Aug. 7, 1978

Related U.S. Application Data

[63] Continuation-in-part of Ser. No. 825,496, Aug. 17, 1977, abandoned.

[51] Int. Cl.³ .............................................. F16L 13/10
[52] U.S. Cl. ..................................... 285/21; 285/423; 285/DIG. 16
[58] Field of Search ................... 285/21, 22, 260, 379, 285/391, 423, 230, 231, 345, 114, DIG. 7, 16; 156/294, 272; 277/207 A

[56] References Cited

U.S. PATENT DOCUMENTS

| 2,451,070 | 10/1948 | Chamberlain | 285/231 X |
| 3,620,875 | 11/1971 | Guglielmo | 156/272 |
| 3,620,876 | 11/1971 | Guglielmo | 156/272 |
| 3,887,992 | 6/1975 | Parmann | 285/423 |
| 4,047,739 | 9/1977 | Aitken | 285/21 |

FOREIGN PATENT DOCUMENTS

| 1919549 | 11/1970 | Fed. Rep. of Germany | 285/230 |
| 1562486 | 4/1969 | France | 285/345 |
| 49-5166354 | 9/1974 | Japan | 285/231 |
| 1139148 | 1/1969 | United Kingdom | 285/345 |
| 1315719 | 5/1973 | United Kingdom | 285/21 |

Primary Examiner—Dave W. Arola
Attorney, Agent, or Firm—Robert M. Krone; Joseph J. Kelly; Gregory W. O'Connor

[57] ABSTRACT

The bell end of a bell and spigot joint is disclosed herein and includes an end section of a plastic pipe, an axially extending circumferential insert located concentrically within this end section, and a circumferential sealing gasket located within a groove in the inner surface of the insert. A method of making this bell end is also disclosed.

9 Claims, 3 Drawing Figures

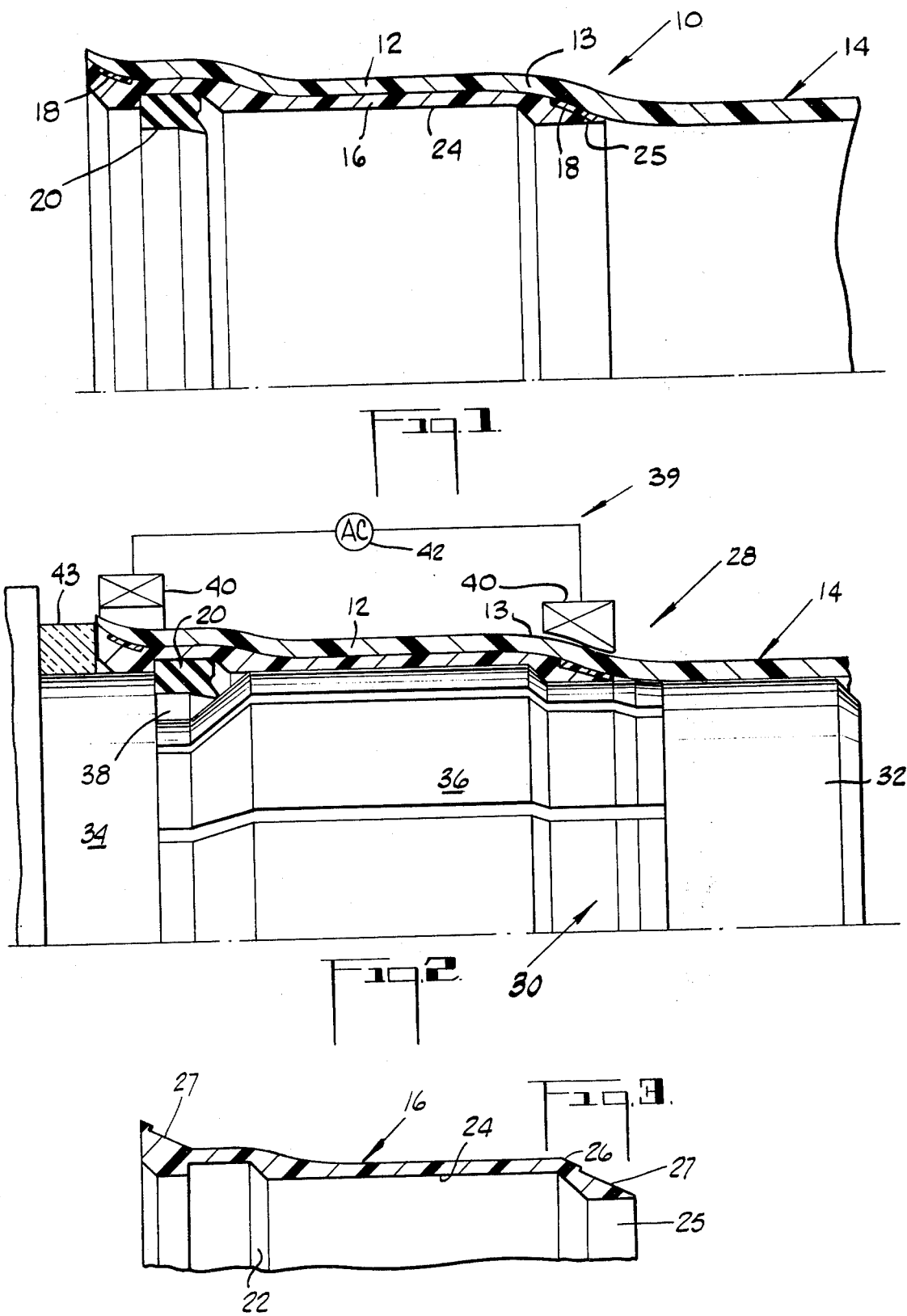

BELL END OF A BELL AND SPIGOT JOINT

This is a continuation-in-part of Ser. No. 825,496 filed Aug. 17, 1977, now abandoned.

BACKGROUND OF THE INVENTION

The present invention relates generally to the bell end of a plastic pipe joint and more particularly to a bell end designed for use in pressure service and to a method of making the bell end.

There are presently a number of conventional ways to manufacture the bell end of a bell and spigot joint from one end section of a plastic pipe, specifically a polyvinyl chloride (PVC) plastic pipe. In one such method, the end section of the pipe is first heated to its state of thermal deformability. While in this state, the heated end section is moved along and around a flared or bell shaped mandrel. In some cases, for example in U.S. Pat. Nos. 3,793,427; 3,807,027 and 3,924,999, an annular sealing gasket is positioned around the mandrel prior to forming the heated end section around the latter. In this way, a circumferential groove is formed in the bell end for housing the sealing gasket.

Where the bell end just described is formed from an end section which is initially the same thickness as the rest of the pipe, the wall defining the resultant bell end will of course be thinner. This is perfectly satisfactory where the pipe joint including such a bell end is intended for use in nonpressure service. However, where the pipe joint is intended for use in pressure service, some specifications require that the wall defining the bell end be thicker in cross-sectional configuration than would be the case by belling the normal configuration of the pipe. One way to accomplish this is by thickening the end section of the pipe to be belled before belling takes place. This can be carried out during the actual extrusion of the pipe, as described in U.S. Pat. No. 3,264,383, or it can be carried out after formation of the pipe, as described in copending U.S. application Ser. No. 722,187, filed Sept. 17, 1976.

As will be discussed in more detail hereinafter, the present invention is also directed to a pipe joint and particularly to a bell end intended for use in pressure service. However, the bell end constructed in accordance with the present invention is neither pre-thickened nor post-thickened but rather utilizes a rather unique combination of components to make it suitable for pressure service.

SUMMARY OF THE INVENTION

One object of the present invention is to provide an uncomplicated, economical and reliable bell end comprising part of a bell and spigot joint which is intended for use in pressure service.

Another object of the present invention is to provide a method of making this bell end in a way which does not require either pre-thickening or post-thickening one end section of a pipe.

The bell end constructed in accordance with the present invention is comprised in part of one end section of a plastic pipe, which end section has a greater inner diameter than the rest of the pipe. An axially extending circumferential insert is located concentrically within this end section and against its inner surface. The insert is held in place by suitable means and includes a concentric, circumferential groove located in its inner surface, which groove is adapted to receive a circumferential sealing gasket, a portion of which extends out beyond the inner surface of the insert.

In a preferred embodiment of the present invention, the insert is held in place within the enlarged end section by two strips of bonding material, one of which circumscribes the outer surface of the insert at one end section thereof and the other of which circumscribes the outer surface of the insert at the opposite end section thereof. In an actual working embodiment of the present invention, this bonding material includes polyvinyl chloride, for example flexibilized PVC, having an electromagnetic composition, for example iron filings. However, the bonding material can be constructed of other suitable means, for example reaction cement or other chemical bonding cement.

In accordance with a preferred method of forming the bell end just described, the insert is first formed and positioned concentrically around and against the outer surface of a mandrel. The insert may or may not include the aforedescribed sealing gasket at this point in time. The previously described end section is heated to its state of thermal deformability and moved along the mandrel and thereafter over and against the outer surface of the insert. Means, for example the aforedescribed strips of bonding material, are provided for holding the insert in place and the end section is cooled to a temperature below its state of thermal deformability, whereby the end section shrinks tightly around the insert. Finally, the cooled end section and insert are separated from the mandrel and the sealing gasket is placed within the insert if this has not already been carried out.

BRIEF DESCRIPTION OF THE DRAWING

FIG. 1 is a frontal cross-sectional view of the bell end of a bell and spigot joint, which bell end is constructed in accordance with the present invention.

FIG. 2 is a frontal cross-sectional view of an assembly utilized in the formation of the bell end illustrated in FIG. 1.

FIG. 3 is a frontal cross-sectional view of one component of the bell end of FIG. 1.

DETAILED DESCRIPTION AND PREFERRED EMBODIMENTS

Turning now to the Drawing, wherein like components are designated by like reference numerals throughout the various Figures, attention is first directed to FIG. 1 which illustrates the bell end 10 of a bell and spigot joint, formed in accordance with the present invention. As illustrated in FIG. 1, bell end 10 includes an end section 12 of a plastic pipe 14, a tapering section 13 joining end section 12 to the rest of the pipe, an axially extending circumferential insert 16, means 18 for holding the insert in place within end section 12, as will be described in more detail hereinafter, and a circumferential sealing gasket 20.

Pipe 14 may be of any suitable cross-section and may be constructed of any plastic material. However, in an actual working embodiment of the present invention, the pipe's cross-section is circular and it is constructed of polyvinyl chloride which may or may not include fillers. As illustrated in FIG. 1, end section 12 is enlarged relative to the rest of the pipe, that is, it has a greater inner diameter. In this regard, it should be noted from FIG. 1 that the wall defining end section 12 is somewhat thinner in cross-section than the rest of pipe 14. This is a result of the preferred way in which enlarged end section 12 was formed. More specifically, the undeformed end section of pipe 14, having the same wall thickness as the rest of the pipe was actually deformed outwardly to form enlarged end section 12, without decreasing its length and thereby thinning it out. Because of this relative thinness of end section 12 compared to the wall thickness of the rest of pipe 14, the end section may not be suitable for use as a bell end, in and by itself, particularly where the bell end is intended for use in pressure service. However, in accordance with the present invention, "thickness" is added to this end section in an uncomplicated, economical and reliable way, specifically by means of insert 16, thereby making bell 10 suitable for pressure service.

Turning to FIG. 3, attention is directed to insert 16 which is constructed of any suitable material which can be readily held in place within end section 12 and is formed in any suitable manner. However, in a preferred embodiment of the present invention, the insert is constructed of polyvinyl chloride and is injection molded into the shape illustrated. As illustrated, the insert is formed with a concentric, circumferential groove 22 located in its inner surface 24. This groove is adapted to receive an outer circumferential portion of sealing gasket 20 while an inner circumferential portion thereof projects radially inward beyond innermost surface 24, as illustrated in FIG. 1. The groove may be designed to receive the gasket in a rather tight locked-in fashion so that the gasket does not have to be bonded in place or, as illustrated, the groove can be selected to require bonding. In this latter case, where bonding is required, any suitable bonding material such as polyurethane adhesive can be utilized.

Returning to FIG. 1, it can be seen that insert 16 fits tightly within enlarged end section 12 such that the outer surface of the insert and the inner surface of the end section are in close confronting relationship with one another. In this regard, the insert preferably extends the entire length of end section 12 and includes a tapered back end 26 (FIG. 3) which approximately conforms with the inner surface of transverse section 13 joining end section 12 with the rest of pipe 14. The insert may be held in place by any suitable means including a reaction cement such as DuPont's 2 part Acrylic adhesive sold under for example "CAVALON" and made available by H. B. Fuller Company. In a preferred embodiment of the present invention, a flexibilized polyvinyl chloride which is applied in a manner to be described hereinafter is utilized.

The bonding material selected may be provided uniformly between and along the entire confronting surfaces of insert 16 and end section 12. However, in accordance with the present invention, a first circumferential strip of bonding material (indicated at 18) is provided around the outer surface of the insert, actually between the insert and end section, at or near one end of the insert and a second circumferential strip of the same bonding material (also indicated at 18) is provided around the outer surface of the insert, again actually between the insert and end section, at or adjacent the other end of the insert. It should be noted that both strips 18 form or present the generally conical surfaces adjacent each end of the insert 16. Both of these conical surfaces face towards the same end of the insert, in this case the tapered end which is received within the heat deformed end of pipe 14 adjacent the undeformed portion thereof (see FIG. 1). While the bonding material may be applied directly to the outermost surface of insert 16, in a preferred and actual working embodiment of the present invention, the insert includes circumferential grooves 27 located in the outer surface of insert 16 at or adjacent to the ends of the insert, as illustrated in FIG. 3. These grooves are adapted to receive bonding material 18. In this regard, in an actual working embodiment of the present invention, the bonding material selected is the previously recited flexibilized polyvinyl chloride having iron filings distributed therethrough. However, it is to be understood that any suitable PVC, including an electromagnetic composition, can be used. The preferred bonding material in the working embodiment is in the form of strips which fit within and fill grooves 27 as illustrated in FIG. 3.

From the foregoing, it should be apparent that bell end 10 is adapted to receive a spigot end, that is, the undeformed end of a plastic pipe identical to pipe 14. In this regard, it should be noted that the diameter of inner surface 24 of insert 16 is greater than the outer diameter of undeformed pipe 14. Diameter 25 (inner surface of tapered end of insert) is also greater than the inner diameter of the undeformed pipe. However, as stated previously, gasket 20 projects inwardly beyond inner surface 24 and extends beyond the outer surface of undeformed pipe 14. In this manner, the spigot end of the bell and spigot joint can be readily assembled into the bell end and yet the sealing gasket 20 can provide a reliable seal between the bell end and spigot.

Having described bell end 10, attention is now directed to FIG. 2 which illustrates an assembly 28 utilized in a preferred method of making the bell end. As indicated in FIG. 2, this assembly includes an axially extending, cylindrical mandrel 30 of a nonferrous material, for example bronze or copper, having a rearward section 32, a forwardmost section 34 and collapsible intermediate section 36 joining the rearward and forward section. Section 36 is preferably made of six segments having small gaps therebetween in its expanded condition as shown. These segments are moved towards one another by known means thus closing these gaps and reducing the effective diameter of section 36. This permits the mandrel to be easily axially extracted after insert 16 has been bonded in place as will be set forth more fully. As indicated, rearward section 32 has an outer diameter approximately equal, actually slightly smaller, than the inner diameter of undeformed pipe 14. Forwardmost section 34 has an outer diameter which is equal to (actually slightly larger than) the outer diameter of undeformed pipe 14 and hence equal to (or slightly larger than) the outer diameter of the spigot end of the pipe joint including bell end 10. Section 36, of course, tapers in two steps outwardly from rearward section 32 to forward section 34. The mandrel may or may not include a circumferential recess 38 positioned in and concentrically around the outer surface of forward section 34, near the front end thereof. Where the sealing gasket 20 is prepositioned within groove 22, as will be described in more detail hereinafter, the recess may be necessary. On the other hand, where the gasket is not positioned within groove 22 until formation of end section 12 about insert 16, as will also be described hereinafter, recess 38 is not necessary.

Where the particular bonding material 18 selected to bond insert 16 in place within enlarged end section 12 of pipe 14 is PVC with electromagnetic composition, assembly 28 requires the utilization of means to excite the electromagnetic material in accordance with U.S. Pat. Nos. 3,620,875 and 3,620,876. In accordance with this patent, such means includes a copper induction coil (or coils located adjacent the bonding material and a source of AC power connected to the coil (or coils) to energize the latter. This AC power produces a fluctuating magnetic field across the bonding material which in turn excites the electromagnetic material, for example the iron filings, and causes the PVC to bond. As illustrated in FIG. 2, two such coils, specifically coils 40, are positioned concentrically around the outer surface of end section 12 adjacent bonding material 18. Electrical insulation means 43 may be desirable or necessary between the coils and mandrel to prevent shorting the two out. A suitable AC source 42 is shown schematically connected to the two coils. The exact positional relationship between the bonding material and the coils and the exact amount and type of power required to excite the electromagnetic material within the bonding material can be readily determined by those skilled in the art in view of the afore-recited U.S. Pat. Nos. 3,620,875 and 3,620,876. Of course, where the bonding material is not PVC with electromagnetic material, assembly 10 will not require the elaborate means just described.

Having described assembly 28, attention is now directed to one of Applicants' preferred methods of forming bell end 10. One step in this method requires that the insert 16 be formed. As stated previously the insert can be provided in any suitable way but is preferably injection molded to the shape described previously. Once formed, circumferential sealing gasket 20 may be prepositioned within groove 22 and bonded in place if necessary or this step can be carried out later in the overall sequence. In any case, the insert, with or without the gasket in place, is positioned concentrically around and against the outer surface of mandrel 30, specifically along front section 34 of the latter. In the event that the gasket 20 is prepositioned within groove 22 of the insert, previously described recess 38 is provided within the mandrel and that portion of the gasket projecting inwardly from the insert is positioned within the recess.

Having positioned insert 16 around mandrel 30 in the manner described, bonding material 18 is located within grooves 27, that is, if the bonding material has not already been applied. The end section of plastic pipe 14 is heated to its state of thermal deformability utilizing conventional means (not shown) and carried out in a conventional way by those with ordinary skill in the art. After the end section has been so heated, it is moved by relative movement of the end section and mandrel along the latter and thereafter over and against the outer surface of insert 16. Conventional means (not shown) can be readily provided for carrying out this relative movement.

Where the particular bonding material selected is the type requiring excitation means 39, these means are now utilized to provide the appropriate bonding. After this has been accomplished, end section 12 is allowed to cool to a temperature below its state of thermal deformability. In this way, the end section shrinks tightly around the insert, especially where grooves 27 have been provided in the latter so that the bonding material does not project outwardly beyond the outer surface of the insert. Thereafter, section 36 is collapsed and mandrel 30 is separated from the formed bell end. If gasket 20 has not already been positioned in groove 22, it is provided at this time.

What is claimed is:

1. In a plastic pipe, the bell end of a bell and spigot joint comprising:
   (a) an end section of said plastic pipe, said end section having a greater inner diameter than the rest of said pipe, said end section having a conical surface at the end thereof and at its junction with the rest of the pipe;
   (b) an axially extending circumferential insert positioned concentrically within said end section and against the inner surface thereof extending substantially the length of said end section, said insert having an inner diameter greater than said spigot, axially spaced ends, and including a concentric, circumferential groove for receiving a sealing gasket located in its inner surface and spaced from said axially spaced ends; and
   (c) means for bonding said insert to said inner surface of said end section within said end end section at said conical surfaces such that said insert adds thickness to the wall of said end section, said means for bonding including a first circumferential strip of bonding material circumscribing the outer surface of said insert at one end thereof to form a generally conical surface adjacent said end, and a second circumferential strip of said bonding material circumscribing the outer surface of said insert at the opposite end thereof forming a second conical surface adjacent said opposite end of said insert, said conical surfaces formed by said bonding material facing towards the rest of said pipe.

2. A bell end according to claim 1 wherein said means for bonding said insert includes polyvinyl chloride having an electromagnetic composition which has melted selected portions of said inner surface so as to form a bond in response to said composition absorbing electromagnetic energy.

3. A bell end according to claim 2 wherein said polyvinyl chloride is flexibilized polyvinyl chloride and wherein said composition is iron filings.

4. A bell end according to claim 1 wherein said means for bonding includes reaction cement.

5. A bell end according to claim 1 wherein said insert includes first and second coaxial, circumferential grooves located within its outer surface at said end sections, respectively, said first and second strips of material being located within said grooves.

6. A bell end according to claim 5 wherein said bonding material includes polyvinyl chloride having an electromagnetic composition which has melted selected portions of said insert and said inner surface of said end section adjacent said bonding material.

7. A bell end according to claim 1 wherein said bonding material includes polyvinyl chloride having an electromagnetic composition.

8. A bell end according to claim 1 wherein the outer surface of said insert and the inner surface of said pipe end section, between said strips of bonding material are in direct contact with each other.

9. A bell end according to claim 1 wherein said groove has a circumferential sealing gasket located therein, a portion of said gasket extending out beyond the inner surface of said insert.

* * * * *